May 5, 1970 D. H. PAULSON 3,510,786

SYNCHRONIZING CIRCUIT COMPENSATING FOR DATA BIT SHIFT

Filed July 25, 1967

*INVENTOR*
DAVID H. PAULSON

BY Nathan N. Kallman

ATTORNEY

United States Patent Office 3,510,786
Patented May 5, 1970

3,510,786
SYNCHRONIZING CIRCUIT COMPENSATING FOR DATA BIT SHIFT

David H. Paulson, San Jose, Calif., assignor to International Business Machines Corporation, Armonk, N.Y., a corporation of New York Filed July 25, 1967, Ser. No. 655,911
Int. Cl. H03k 5/18
U.S. Cl. 328—155 11 Claims

ABSTRACT OF THE DISCLOSURE

In a magnetic recording and reproducing apparatus which employs a modified frequency modulation, a synchronizing circuit comprising a detector for detecting if a received data bit occurs during a defined error transition interval of a reference waveform and suitable delay means for shifting bits that do occur during the defined error transition interval out of the defined error transition interval.

CROSS-REFERENCE TO RELATED APPLICATION

Copending U.S. patent application Ser. No. 653,784 filed July 17, 1967, and assigned to the same assignee, discloses a data processing apparatus that employs a modified frequency modulation and novel decoding technique in order to improve detection of recorded binary data. This previously filed application teaches the use of an asymmetrical data gate signal to afford a longer interval for detection of data bits and to accommodate bit shift, which may occur with high density magnetic recording and playback.

BACKGROUND OF THE INVENTION

Field of the invention

The present invention relates to a binary data processing apparatus, and in particular, to a novel synchronizing circuit that compensates for spurious bit shifts that may be experienced in an apparatus which utilizes modified frequency modulation.

DESCRIPTION OF THE PRIOR ART

To increase the storage density and handling capability of apparatus wherein binary data is recorded on a magnetic medium, a modified frequency modulation (MFM) has been proposed and used heretofore. In an MFM system, a transition that is manifested by a flux reversal on the magnetic medium or tape occurs at the midpoint of the bit cell period for a first binary value, which may be a binary "1," for example; and at the leading edge of the bit cell period, a second binary value, a binary "0," except when the "0" immediately follows a "1." The presence of a data pulse B may be arbitrarily designated as a value "1," and the absence of a data pulse $\overline{B}$ may be designated as a "0" value. The "0" transitions may be used for timing or as a clock pulse. MFM affords several advantages, such as an increased signal and an improved signal-to-noise ratio, less sensitivity to variations in spacing of data bits and less peak shift, among other things.

In a binary data magnetic recording and reproducing system, tape stretch, variations in head-to-tape spacing or alignment, and the like, result in a peak shift or phase shift of the bit cells. In the event such bit shifting occurs, the data pulses may move closer together, giving rise to a pulse crowding condition. Bit shift causes distortion, poor signal-to-noise ratio, and loss of information, among other things. Apparently, one way to avoid such degrading effects is by reducing storage density, which is not desirable. Another approach is to utilize MFM and to improve the coding and decoding techniques, whereby the feature of high packing density is realized with a substantial minimization of the above-mentioned problems.

In the aforementioned copending application, MFM is successfully employed in conjunction with a novel decoding technique to achieve approximately double the packing density found in binary data recording systems incorporating conventional modulation techniques. In operation of the apparatus disclosed therein, a ramp signal is generated at twice the frequency of the data signal being recovered from the magnetic medium; that is, the ramp pulse period is one-half that of the data bit period T. The data pulse that is being detected is referenced to the midpoint of the slope of alternate ramp pulses; and if there is an error or phase difference, a correction is supplied by a variable frequency oscillator, which includes the ramp generator and an error detector, to shift the ramp signal so that the data pulse is aligned with the ramp slope midpoint. However, if the bit shift is so excessive that the data pulse coincides with the ramp retrace interval, an erroneous correction may result.

SUMMARY OF THE INVENTION

An object of this invention is to provide a binary data recording and playback system affording high packing density with minimized bit shift problem.

According to this invention, a binary data recording and playback system, that employs a modified frequency modulation, comprises means for sensing the position of each data pulse relative to a reference ramp waveform. Each data bit cell interval is substantially equivalent to two ramp pulse periods; that is, the reference ramp frequency is twice that of the data frequency. A variable frequency oscillator affords frequency and phase correction, whereby the data pulses are aligned with the midpoint of the slopes of alternating ramps of the reference waveform. In apparatus wherein the problem of extreme bit shit arises, a "spillover" into the retrace interval or adjacent ramp may take place, resulting in a correction of wrong polarity. To ensure that the phase adjustment is always in the correct direction when extreme bit shift occurs, a logic detection circuit senses at which side of the reference ramp midpoint that the pulse appears, and a suitable variable delay is applied to the data pulse. In order to be able to provide a "negative delay" or time advance of the data pulse, as well as a positive delay, the data signal is first delayed for a fixed interval, which may be one ramp period, by way of example, so that the data pulse occurs during the second ramp period of each bit cycle or cell interval. This fixed delay and the variable correction delay serve to align the data pulse in the bit cell so that decoding and demodulation may be accurately accomplished, while the bit shift problem found in high density magnetic recording systems is minimized.

BRIEF DESCRIPTION OF THE DRAWING

The foregoing and other objects, features and advantages of the invention will be apparent from the following more particular description of preferred embodiments of the invention, as illustrated in the accompanying drawing, in which:

FIG. 2*a*–1 is a series of waveforms that serve to illustrate the operation of the circuit of FIG. 1.

DESCRIPTION OF THE PREFERRED EMBODIMENTS

With reference to the drawings, a detection circuit useful in a binary data magnetic record and playback system comprises a variable frequency oscillator (VFO) 10 that includes a ramp generator 12 which produces a ramp signal 14 (FIG. 2*a*) having a frequency **2*f*, twice that of the frequency of the data being recovered from storage, and an error detector 16 coupled to the input of the generator 12. The ramp generator 12 is started and maintained at correct frequency and proper phase relative to the magnetic record system under control of a synchronizer (not shown) that supplies timing pulses to various elements of the apparatus. The frequency and phase of the ramp generator 12 is adjusted by the error detector 16** in response to sampled data pulses, that are first compensated, in accordance with this invention, to phase lock the reference ramp signal and raw data being recovered from storage, such as a magnetic tape means.

Figure 1:
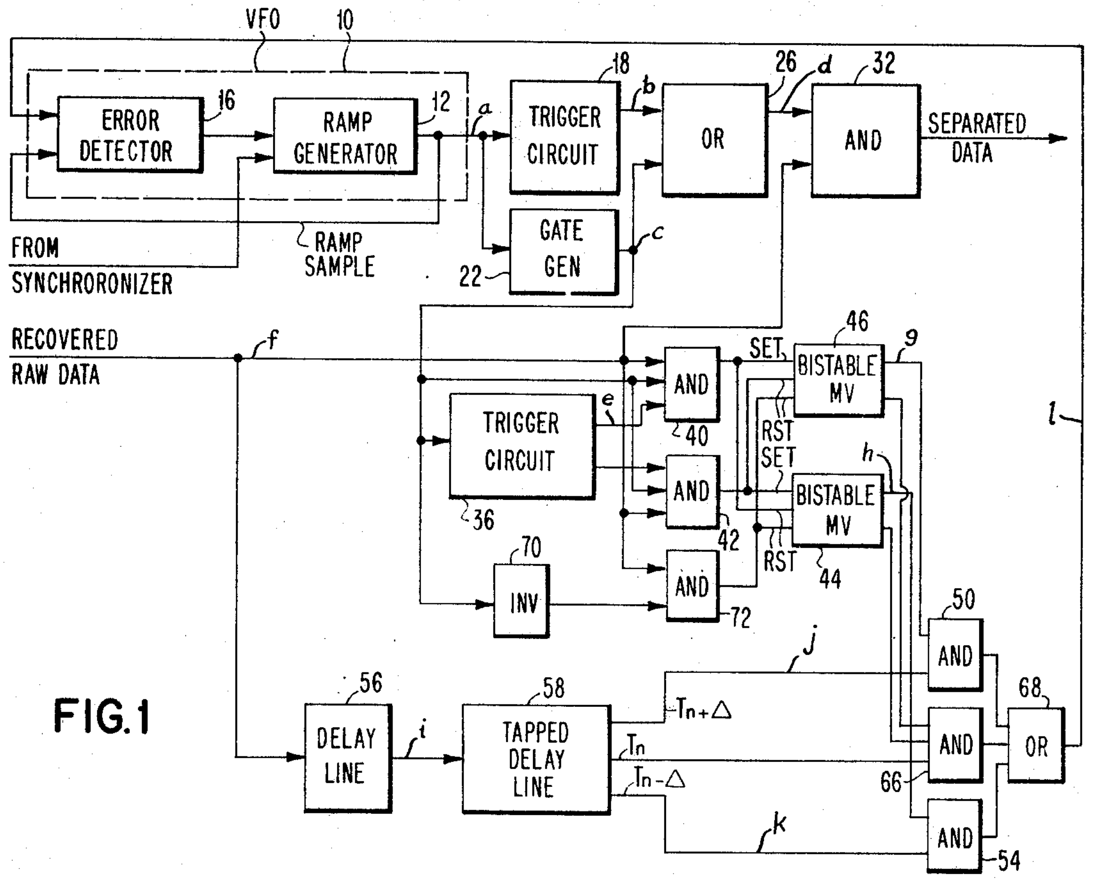
FIG. 1 is a block diagram of the decoding and detection circuit of this invention.
Figure 2:
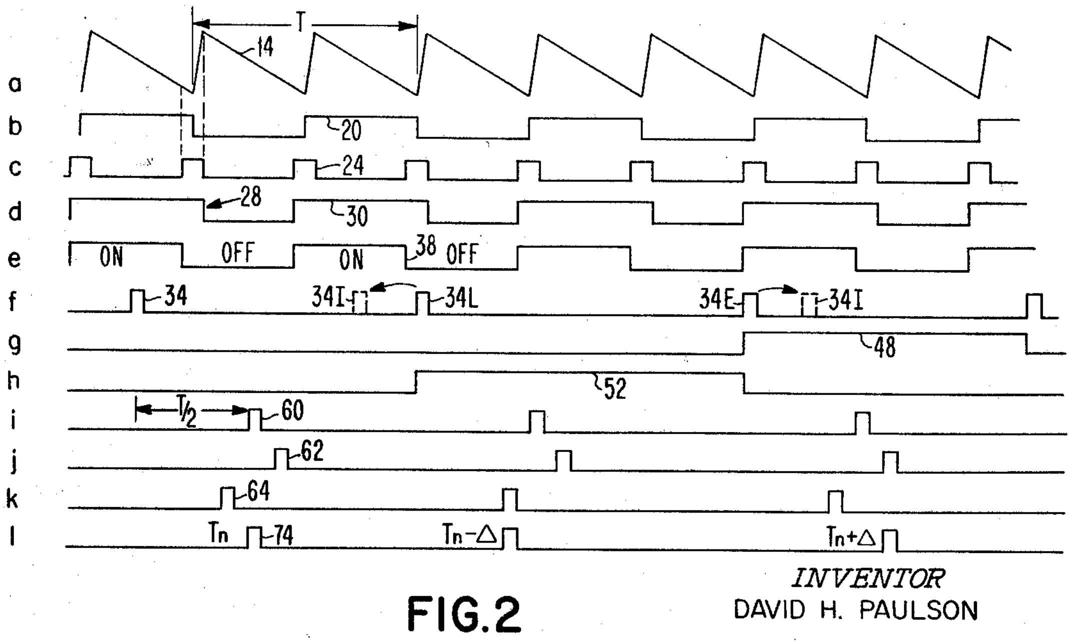

The ramp generator output 14 is applied to a trigger circuit 18, which produces a gate pulse 20 (FIG. 2*b*) having a frequency 2*f*, twice that of the raw detected data. At the same time, the ramp pulse 14 is fed to a gate generator 22, which includes, inter alia, threshold detectors where each senses a different level or voltage of the ramp waveform. A nonsymmetrical bias gate signal 24 (FIG. 2*c*) is developed for application to a logic OR gate 26 simultaneously with the gate pulse 20 from the trigger circuit 18. As a result a nonsymmetrical data gate signal 28 (FIG. 2*d*) is formed having a time portion or window 30 allotted for processing the data pulse signal (represented by binary "1's" in this embodiment), such window being greater than that used for passing the binary "0's", which serve as timing information or a clock pulse. The window 30 may comprise 60% of the bit period T as compared to 40% of the clock window, by way of example. The data gate signal 28 is directed to an AND gate 32, which also receives the recovered raw data signal 34 (FIG. 2*f*). The data signal 34 is passed through the AND gate 32 during the window interval 30, and the separated data are processed for further utilization.

In accordance with this invention, a logic and delay circuit is coupled to the data separating means to determine the phase of the recovered raw data pulse 34 relative to the ramp signal 14, and to provide a suitable delay to the recovered data pulse to compensate for extreme bit shift. To this end, a binary trigger circuit or flip-flop 36, responsive to the positive going, leading edge of the bias gate pulse 24 from the gate generator 22, produces a square wave clock pulse 38 (FIG. 2*e*) of 2*f* frequency. The trigger 36 is alternately OFF and ON for each data bit cycle, and provides the clock pulse 38 respectively to a three-input AND gate 40 during the ON half-cycle, and to a second three-input AND gate 42 during the OFF half-cycle. The AND gates 40 and 42 are further conditioned by the bias gate output 24 from the gate generator 22. Upon coincidence of a raw rata pulse 34 with the bias gate signal 23, either AND gate 40 or AND gate 42 is enabled, according to the state of the trigger circuit 36. When the trigger 36 is in the OFF state, which delineates the first half of the bit cycle, then AND gate 42 is energized to provide a SET pulse to a binary trigger circuit or bistable multivibrator 44. On the other hand, if the trigger 36 is in the ON state, then AND gate 40 is enabled to set a binary trigger circuit 46. In addition, if AND gate 40 is enabled, trigger 44 is biased OFF; and if AND gate 42 is enabled, trigger 46 is biased OFF.

It should be noted that the bias gate signal 24 is substantially coincident with the ramp retrace interval, and substantially displaced from the reference midpoint of the ramp slope. Thus, in the event that a data pulse 34 occurs during the retrace period, one of the channels, including AND gate 40 and trigger 46, or AND gate 42 and trigger 44 will be activated. If the data pulse 34 occurs during a retrace between bit cycles, then such pulse 34L (shown in FIG. 2*e* as displaced an interval X from 34I the ideal phase) has arrived late relative to the ramp midpoint used as the reference for synchronizing by the VFO 10. In contrast, if the data pulse 34 occurs during a retrace at mid-interval of the bit cycle, then the pulse 34E has appeared early relative to the reference ramp midpoint, and is displaced by an interval Y from the optimum position.

When the bistable multivibrator 46 is switched ON upon occurrence of an early data pulse 34E, then a positive voltage or set pulse 48 (FIG. 2*g*) is applied to a logic AND gate 50. In contradistinction, when a late data pulse 34L is received, the trigger 44 is biased ON, then a positive voltage or set pulse 52 (FIG. 2*h*) is applied to AND gate 54.

In accordance with this invention, the raw data signal 34 that is recovered from storage is directed through a delay channel, including a fixed delay line 56 and tapped delay line 58 to the AND gates 50 and 54. The delay line 56 is adjustable, but is initially set to provide a delay of one ramp period ($T/2$) to the recovered data, as depicted in FIG. 2*i*. This delayed incoming data signal 60 is referenced to the slope midpoint of the first ramp period of the data bit interval T, in lieu of the second ramp period of each bit cycle.

The delayed data pulse 60 energizes the tapped delay line 58, which developes three constant outputs, namely, a data pulse having the same phase or nominal time $T_n$ as the delayed data signal 60; a data pulse 62 (FIG. 2*j*) that has been further delayed by a predetermined interval $\Delta$ and occurs at $T_n+\Delta$; and a data pulse 64 (FIG. 2*k*) that has been advanced relative to nominal time $T_n$ by the predetermined interval $\Delta$, appearing at $T_n-\Delta$.

The delayed pulse 62 is fed to the "early" AND gate 50, the advanced pulse 64 is steered to the "late" AND gate 54, and the zero delay pulse 60 is directed to a "zero error" three input AND gate 66. If the recovered data pulse 34 is an early pulse 34E such that the trigger 46 and AND gate 50 have been activated, then the delayed data 62 is passed through an OR gate 68 and fed back to the error detector 16. If the recovered data pulse 34 is a late pulse 34L such that the trigger 44 and AND gate 54 are activated, then the advanced data 64 is channeled through the OR gate 68 to the error detector 16 and VFO 10. If the data pulse 34 is in proper phase relative to the midpoint of the ramp slope, then no delay (or advance) is needed, and a data pulse of nominal time $T_n$ is supplied to the AND gate 66.

The logic circuitry including the triggers 44 and 46 provide a RESET pulse to the AND gate 66, whenever either of the triggers 44 or 46 is ON. However, whenever the recovered raw data pulse 34 does not coincide with the bias gate signal 24 that is developed in coincidence with each retrace interval of the ramp, the AND gates 40 and 42 are not enabled, and triggers 44 and 46 are OFF. This condition is achieved by a circuit branch including an inverter 70 and AND gate 72 coupled to the gate generator 22. The bias gate signal 24 from the generator 22 is inverted by inverter 70 so that a positive voltage or SET signal is applied to the AND gate 72 during ramp slope intervals, and not during the retrace intervals. When a data pulse 34 appears during the slope interval, AND gate 72 pulses both triggers 44 and 46 to the OFF condition. In such case, AND gates 50 and 54 are in the RESET state, and will not conduct to the OR gate 68. However, the OFF condition of the triggers 44 and 46 in conjunction with a zero delay data signal $T_n$ from the tapped delay line 58 will enable AND gate 66 to pass the uncompensated data pulse 60 to the OR gate 68 for feedback to the VFO 10.

The VFO 10 provides a fine correction to synchronize the data pulse, which has been compensated for extreme bit shift, to the reference ramp waveform 14. The compensated data pulse 60, 62, or 64 is applied to the error detector 16, which receives the reference ramp signal 14 from the generator 12. The frequency and phase of the compensated data pulse signal is locked to the reference, and the ramp sampled data output 74 (FIG. 2*l*) of the generator 12 is processed for separation and further utilization.

In effect, the logic and delay circuit provides an initial correction to the recovered data pulse 34, whereby subsequent fine synchronization by the variable frequency oscillator 10 is enhanced. The VFO 10 samples the second ramp of each bit period for midramp centering of the data pulse. Since the logic and delay circuit of this invention accomplishes the necessary corrections for extreme bit shift initially, the VFO can easily follow all variations of the incoming data and accurately compensate for bit shift.

There has been described herein a binary detection and decoding apparatus that comprises a logic and delay circuit for sensing the frequency and phase of data pulses, and for compensating for spurious large shifts of the data. Further correction to synchronize the data to a reference is effected by a variable frequency oscillator.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. A binary data processing system, wherein high density data pulses are received sequentially at a basic frequency comprising:

- a generating means for generating a reference waveform at a multiple of said base frequency;
- a gating means connected to said generating means for developing an asymmetric data gate signal from said reference waveform, said asymmetric data gate signal being active only during error transition intervals of said reference waveform;
- a separating means connected to said generating means and to said gating means for detecting said data pulses that occur in coincidence with said asymmetric data gate signal and for separating said detected data pulses that occur early in phase from said detected data pulses that occur late in phase when referenced to said reference wavefrom; and
- a phase adjusting means connected to said separating means for adjusting the phase of said data pulses according to said data pulses detection and separation.

2. A system as in claim 1, wherein said generating means constitutes a ramp generator for providing a reference ramp signal.

3. A system as in claim 2, including an error detection means coupled in a closed loop with said ramp generator for varying the frequency of said ramp signal in accordance with said adjusted data pulses.

4. A system as in claim 2, wherein said ramp generator generates a reference ramp signal having a frequency twice that of the data base frequency.

5. A system as in claim 4, wherein said separating means reference said data pulses to the midpoint of the slope of alternate ramps.

6. A system as in claim 1, wherein said separating means includes first and second circuit branches, and a binary trigger circuit for alternately conditioning each of such branches to enable the gated data signal to be conducted through one of such branches.

7. A system as in claim 6, wherein said separating means further includes a third circuit branch for inactivating said first and second circuit branches when the received data pulses are in phase with respect to the reference waveform.

8. A system as in claim 7, wherein said phase adjusting means comprises a delay circuit that provides a selected delay to the received data pulses, and a tapped delay line coupled to said delay circuit that provides three outputs having a zero error delay, a positive delay, and a negative delay.

9. A system as in claim 8, including a variable frequency oscillator for synchronizing the delayed data pulses to the reference waveform, and logic means for channeling one of said three outputs to said oscillator.

10. A data processing system wherein binary data pulses occur within equally spaced bit periods at a predetermined phase comprising:

- means for receiving such data pulses;
- a data gate connected to said receiving means for passing such pulses only during an error transition portion of each bit period;
- at least one circuit branch connected to said receiving means and said data gate for sensing the phase of the data pulse relative to the predetermined phase; and
- means coupled to said at least one circuit branch for applying a delay to the sensed data pulses to compensate for any difference between the sensed phase and the predetermined phase.

11. Apparatus wherein data bits are stored within bit cells at a base frequency, the data being manifested by flux transitions, the transition representing a first data bit value occurring substantially at the middle of the bit cell, and the transition representing a second bit value occurring substantially at the beginning of the bit cell, except when said second bit value immediately follows a first but value, comprising:

- means for generating a reference waveform having a period that is one-half that of the data bit period;
- means for developing an asymmetric data gate signal, coupled to said reference generating means;
- means for removing the stored bit data;
- means for sensing the phase of the recovered data relative to said reference waveform;
- means for delaying such recovered data for a said reference waveform period;
- means for adjusting the phase of such delayed data in accordance with the sensed phase; and
- means for separating the adjusted and delayed data under control of said asymmetric data gate signal means.

References Cited

UNITED STATES PATENTS

| | | | |
|---|---|---|---|
| 3,200,340 | 8/1965 | Dunne | 328—155 X |
| 3,293,555 | 12/1966 | Mazure | 328—155 |
| 3,333,205 | 7/1967 | Featherston | 328—63 |
| 3,337,747 | 8/1967 | Krasnick et al. | 328—155 X |
| 3,407,356 | 10/1968 | Meranda | 328—63 X |

JOHN S. HEYMAN, Primary Examiner

U.S. Cl. X.R.

328—63, 162